B. BANNISTER.
Elastic Arbors.
No. 162,010.
Patented April 13, 1875.
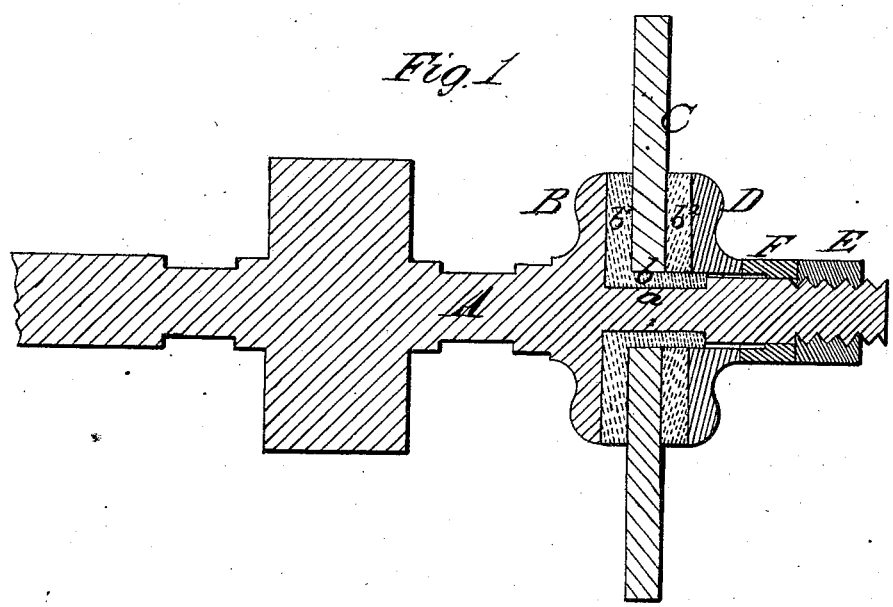
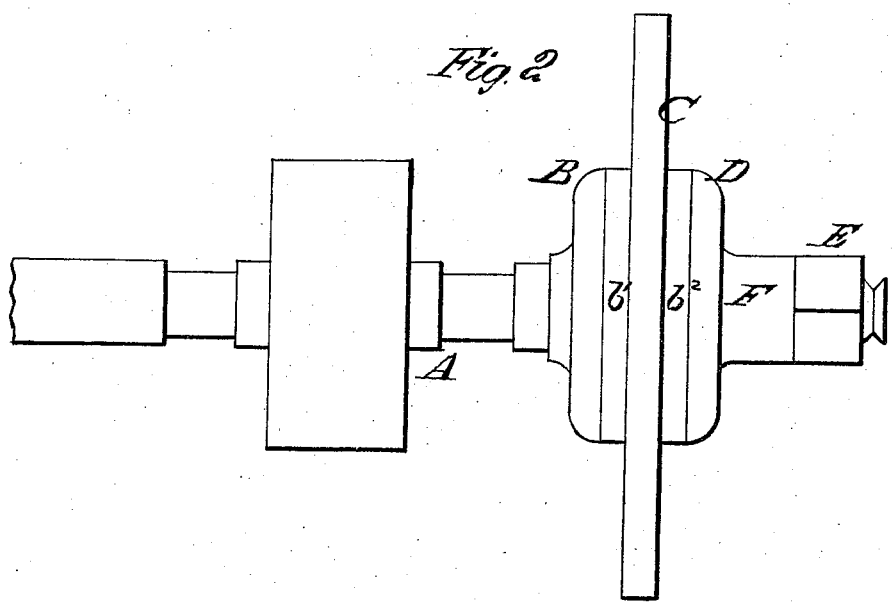
WITNESSES
Michael Carroll
E H Bates
INVENTOR
Burr Bannister
Chipman Hosmer &c
ATTORNEYS

UNITED STATES PATENT OFFICE.

BURR BANNISTER, OF KALAMAZOO, MICHIGAN.

IMPROVEMENT IN ELASTIC ARBORS.

Specification forming part of Letters Patent No. 162,010, dated April 13, 1875; application filed October 17, 1874.

*To all whom it may concern:*

Be it known that I, BURR BANNISTER, of Kalamazoo, in the county of Kalamazoo and State of Michigan, have invented a new and valuable Improvement in Elastic Arbors; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a sectional view of my arbor, and Fig. 2 is a plan view of the same.

My invention has relation to arbors on which to apply grinding and polishing wheels and saws; and it consists in an elastic bearing of india-rubber or any other suitable elastic substance permanently secured on an arbor and adapted to afford a yielding bearing for a wheel or a saw, and prevent undue shaking or trembling of the frame or table on which the arbor is mounted, at the same time allow the wheel or saw to yield when undue resistance is met with, as will be understood from the following description:

In the annexed drawings, A designates an arbor or mandrel in which is formed an annular goove, $a$, adapted to receive and hold firmly in place an elastic bearing, $b$. This bearing $b$ is preferably made of india-rubber, and on one end of it a flange, $b^1$, is formed, for a purpose hereinafter explained. B designates a collar or clamp, which is permanently fixed on the arbor A, and which is of the same diameter as the flange $b^1$ on the bearing $b$. C designates a grinding or polishing wheel, or it may be a circular saw, which is applied on the elastic bearing $b$, and confined in its place between the flange $b^1$ and a removable collar, $b^2$, which latter, like the wheel C, is slipped on the bearing $b$. D designates a collar or clamp, which is of the same diameter as the clamp B, and which is confined in its place by means of a nut, E, between which and the clamp D a long washer, F, is applied. By using washers of different lengths, the parts are adapted for wheels or saws of different thickness.

It will be seen, from the above description, that the wheel C has its bearing on the india-rubber portion $b$, which is, as above stated, permanently secured on the arbor A. Also, that the wheel C is confined, by means of clamps and a nut, between elastic collars $b^1 b^2$, one of which is removable to allow the wheel to be removed from its arbor.

I do not, under this application, claim an elastic eye or center for a wheel, as this forms the subject of the claim in the Letters Patent of myself and J. C. Perkins, numbered 148,545.

What I claim as new, and desire to secure by Letters Patent, is—

1. The grooved arbor A, provided with an elastic bearing, $b$, to receive a wheel or a saw, as described.

2. The collar or flange $b^1$, formed in one piece with the elastic bearing $b$, which is permanently applied on arbor A, in combination with the removable collar $b^2$, as and for the purposes described.

In testimony that I claim the above, I have hereunto subscribed my name in the presence of two witnesses.

BURR BANNISTER.

Witnesses:
E. L. GRIFFIN,
W. T. CARYL.